(12) United States Patent
Bhagwat et al.

(10) Patent No.: US 10,885,007 B2
(45) Date of Patent: Jan. 5, 2021

(54) CUSTOM METADATA EXTRACTION ACROSS A HETEROGENEOUS STORAGE SYSTEM ENVIRONMENT

(71) Applicant: INTERNATIONAL BUSINESS MACHINES CORPORATION, Armonk, NY (US)

(72) Inventors: Deepavali Bhagwat, Cupertino, CA (US); Nilesh Bhosale, Warje (IN); Joseph Dain, Vail, AZ (US); James Hewitt, Eastleigh (GB); Dean Hildebrand, Bellingham, WA (US); Wayne Sawdon, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 568 days.

(21) Appl. No.: 15/646,278

(22) Filed: Jul. 11, 2017

(65) Prior Publication Data

US 2019/0018870 A1    Jan. 17, 2019

(51) Int. Cl.
*G06F 16/00* (2019.01)
*G06F 16/22* (2019.01)
*G06F 16/242* (2019.01)
*G06F 16/25* (2019.01)
*G06F 16/2458* (2019.01)

(52) U.S. Cl.
CPC ........ *G06F 16/2228* (2019.01); *G06F 16/243* (2019.01); *G06F 16/2465* (2019.01); *G06F 16/256* (2019.01)

(58) Field of Classification Search
CPC .......................... G06F 16/2228; G06F 16/2465
See application file for complete search history.

(56) References Cited

U.S. PATENT DOCUMENTS

| | | | |
|---|---|---|---|
| 8,935,204 B2 | 1/2015 | Peto et al. | |
| 9,081,779 B2 | 7/2015 | Gupta | |
| 9,619,487 B2 | 4/2017 | Bane et al. | |
| 2006/0026193 A1 | 2/2006 | Hood | |
| 2010/0057692 A1* | 3/2010 | Yoon ................ | H04N 21/25891 707/E17.014 |
| 2010/0088317 A1 | 4/2010 | Bone et al. | |
| 2010/0332401 A1 | 12/2010 | Prahlad et al. | |

(Continued)

FOREIGN PATENT DOCUMENTS

| | | |
|---|---|---|
| KR | 1020090021932 A | 3/2009 |
| WO | 2015088483 A1 | 6/2015 |

OTHER PUBLICATIONS

List of IBM Patents or Patent Applications Treated as Related dated Jul. 12, 2017 (2 pages).

(Continued)

*Primary Examiner* — Grace Park
(74) *Attorney, Agent, or Firm* — Griffiths & Seaton PLLC (57) ABSTRACT

Embodiments for triggering custom metadata extraction by a processor. Information may be extracted from an event so as to access data across a plurality of heterogeneous storage systems. Metadata may be extracted from the data that is accessed such that the metadata is assigned as custom metadata and indexed into a centralized search index, wherein the custom metadata is correlated to existing metadata associated with the data in the centralized search index.

26 Claims, 6 Drawing Sheets

(56) References Cited

U.S. PATENT DOCUMENTS

| | | | |
|---|---|---|---|
| 2014/0181063 A1* | 6/2014 | Pidduck | G06F 16/951 |
| | | | 707/706 |
| 2014/0310278 A1 | 10/2014 | D'Amato et al. | |
| 2015/0205834 A1 | 7/2015 | Keeton et al. | |
| 2016/0313934 A1 | 10/2016 | Isherwood et al. | |
| 2016/0314163 A1* | 10/2016 | Marquardt | G06F 16/2343 |
| 2017/0161288 A1* | 6/2017 | Feldman | G06F 16/13 |
| 2018/0314751 A1 | 11/2018 | Filippi et al. | |
| 2018/0365627 A1* | 12/2018 | Mansour | G06Q 10/06393 |
| 2019/0163821 A1 | 5/2019 | Pal et al. | |

OTHER PUBLICATIONS

Anonymous, "Method for Notification Events classification based on Tags," An IP.com Prior Art Database Technical Disclosure, IP.com No. IPCOM000206918D, May 13, 2011 (8 pages).

Anonymous, "A method for integrating additional content-oriented metadata into file system data structures to improve user access," An IP.com Prior Art Database Technical Disclosure, IP.com No. IPCOM000240079D, Dec. 29, 2014 (3 pages).

Thorat, "Object Storage Analytics: Leveraging Cognitive Computing for Deriving Insights and Relationships," Storage Developer Conference, Santa Clara, 2016 (34 pages).

* cited by examiner

CUSTOM METADATA EXTRACTION ACROSS A HETEROGENEOUS STORAGE SYSTEM ENVIRONMENT

CROSS-REFERENCE TO RELATED APPLICATIONS

This Application is related to the following applications having U.S. application Ser. Nos. 15/646,269 and 15/646,284, each filed on even date as the present application.

BACKGROUND OF THE INVENTION

Field of the Invention

The present invention relates in general to computing systems, and more particularly to, various embodiments for triggering custom metadata extraction across a heterogeneous storage system environment using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and retrieving very large amounts of information is a key problem to solve.

SUMMARY OF THE INVENTION

Various embodiments for triggering custom metadata extraction across a heterogeneous storage system environment by a processor are provided. Information may be extracted from an event so as to access data across a plurality of heterogeneous storage systems. Metadata may be extracted from the data that is accessed such that the metadata is assigned as custom metadata and indexed into a centralized search index, wherein the custom metadata is correlated to existing metadata associated with the data in the centralized search index.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Within a computing storage architecture, such as a storage area network (SAN) system or cloud computing system, it is often considered desirable to intelligently distribute data across different types of storage media to improve access performance and reduce storage costs. Such types of storage management systems may perform various data management and storage area management functions, including application management, resource availability management, network management, performance management, service management, systems management, and the like. For example, cloud computing is a computing technology that uses the Internet and central remote servers to maintain data and applications. A Cloud provider may employ multiple Clouds when providing a set of services to a customer. There are scenarios where it is necessary for multiple storage systems, such as multiple Clouds, to inter-operate to provide an overall composite service to a customer.

Moreover, computing storage architecture systems are experiencing exponential growth of data (e.g., files and objects) that must be stored, maintained, and/or retrieved. Some data may contain metadata. One way of managing the large amounts of data is by spreading the data across multiple "data storage islands" (or storage subsystems or storage silos) designed to group data according to storage type such as, for example, data storage island 1 (e.g., a blue-ray optical data storage island), data storage island 2 (e.g., a tape drive data storage island), data storage island 3 (e.g., virtual data storage island), and/or data storage island 4 (e.g., a cloud-object data storage island). However, given the complexity and size of many computing storage systems, along with the vast distances separating them, accessing and retrieving data is more complex and difficult thereby decreasing the ability for a user, an administrator, or an application (or other computing resource) to know where the data is located. Being unable to know where the data is located also reduces the ability to understand and learn more about the data itself.

Accordingly, the present invention provides a novel solution for providing access to data in a data storage system so as to enable a user, an administrator, or an application (or other computing resource) for understanding and learning more about the data in an identified location of the computing storage system. For example, because metadata provides insight and value for learning, understanding, and knowing about particular aspects of the data, the metadata may be extracted from the data (e.g., files and objects) of the data storage system/device and index the data into a centralized search index. The metadata may be used to gain additional insight into the data and may be leveraged for cognitive and analytic applications.

Metadata may also be extracted from un-defined application data and the insights extracted from the application data can be stored. For example, a company may desire to understand which data contains sensitive information such as, for example, a social security number and protect the data. A natural language processing (NLP) system can be performed on the data to identify aspects such as, for example, social security numbers and allow the organization to treat the data accordingly.

Accordingly, the present invention provides for triggering custom metadata extraction across a heterogeneous storage system environment by a processor. Information may be extracted from an event so as to access data across a plurality of heterogeneous storage systems. Metadata may be extracted from the data that is accessed such that the metadata is assigned as custom metadata and indexed into a centralized search index, wherein the custom metadata is correlated to existing metadata associated with the data in the centralized search index. In this way, the present invention provides benefits and advantages of the current state of the art since current systems are unable to extract this metadata from the data (e.g., files and objects) because current computing storage areas often times do not know where or which files exist.

In one aspect, the mechanisms of the various embodiments configure a policy engine that, in response to receiving events from heterogeneous storage devices, extract the source system access methods and/or protocols (e.g. S3 Simple storage service provided by Amazon®, IBM® Swift, network file system "NFS", common internet file system "CIFS", etc.), endpoint (e.g. internet protocol IP, hostname), file names and paths, object names and buckets, and/or containers from the event. This information may be provided to access the data (e.g., file and/or object) across a plurality of heterogeneous storage devices. Upon access of the data (e.g., file and/or object), the data may be inspected so as to extract metadata such as, for example, extracting file headers or invoking machine learning and/or natural language processing (NLP) for searching for keywords, regular expressions, etc. The extracted metadata may be added to and indexed in a centralized metadata storage as custom metadata. That is, the extracted metadata may be assigned in the centralized metadata storage (e.g., the centralized search index) as user defined, custom, and/or dynamic metadata. The extracted metadata may be correlated to the existing metadata associated with the data in the centralized metadata storage.

In an additional aspect, the extracted metadata may be appended to the existing user defined, custom, and/or dynamic metadata in the centralized metadata storage. Also, when accessing the data (e.g., file and/or object) from source systems in the heterogeneous storage environment, user names, passwords, and/or encryption keys may be resolved such as when a policy engine integrates with an authentication server (e.g., lightweight directory access protocol "LDAP") and integrates with encryption servers to obtain/retrieve the necessary keys.

A configuration operation (e.g., for a policy engine) may be provided so as to enable users or applications to control the behavior of extracting the metadata (via an extraction engine) where the configuration operation enables users or applications to specify criteria for metadata extraction by tagging objects for extraction through the data path representational state transfer (REST) application protocol interface (API) (e.g. S3 Simple notification service provided by Amazon®, IBM® Swift). The data may be automatically tagged in a storage system based on pre-defined rules in a policy engine. The REST API may provide a flag for enabling extraction, the method or plugin to invoke for extraction, the file type, file extension, owner, username, group, file set, file system, sub-directory name, and/or object/file prefix to invoke the extraction on. The configuration operation (in the policy engine) further provides configuring selected criteria for extraction (e.g., bucket name, file system, file set, sub-directory name, object, file, name prefix, etc.) directly to the policy engine without having to go through the data path REST API.

In one aspect, such as in a hybrid cloud environment, the extraction portion of the policy engine may be placed on-prem and an extraction queue may be polled (such as within a cloud computing environment) to determine what action to take in relation to the extraction (e.g., determine the metadata to extract). Further, the present invention also provides for leveraging capabilities, such as unified file and object, to extract metadata from files via object interfaces and vice versa. For example, an IBM Spectrum Scale® unified file and object enables files in the file system to be accessible via an object interface (e.g. S3 Simple notification service provided by Amazon® object interface, or IBM® Swift object interface). Similarly, objects written into the storage using the object interface can be accessed via a file interface (such as a network file system "NFS", Hadoop Distributed File System "HDFS", etc.)

Thus, the mechanisms of the present invention enable efficient, highly scalable deep learning of data residing on one of a plurality of heterogeneous storage systems in an automated and customizable manner. In one aspect, deep learning may be referred to as using neural networks for machine learning on graphic processing units ("GPUs") to accelerate discovery, which process may be referred to herein as "deep data inspection". Deep learning can be referred to as deep data inspection and/or may include opening data (a file or object), reading and providing content of the opened data to machine learning operations/models, and/or performing header extraction operations/processes that extract the meaning of the data content. The embodiments of the present invention provide real time, event driven, deep inspection of data so as to extract custom metadata and insert the extracted metadata (e.g., custom metadata) into an index such as, for example, a centralized search index where the index is made available for further analytics and insights.

In an additional aspect, the present invention enables real-time extraction of metadata without impacting performance and eliminates consistency issues by enabling the use of the REST API to manage and configure event based extraction of metadata. Also, the present invention may provide an interface to tag objects for extraction through the REST API.

The present invention enables the use of natural language processing (NLP) and artificial intelligence (AI) APIs and other cognitive tools to extract metadata. In one example, an instance of IBM® Watson® NLP may be used (IBM® and Watson® are trademarks of International Business Machines Corporation). An instance of IBM® Watson® API may also be provided so as to extract metadata. The aspects of IBM® Watson® that the described method and system makes use of are the technologies behind IBM® Watson® Natural Language Understanding. However, other NLP technologies or services may be used to provide the extracted metadata as described herein.

The present invention may also provide the ability to extract metadata transparent to a source storage system and associated application and/or user and may work and be employed across multiple heterogeneous storage devices.

The mechanisms of the illustrated embodiments may leverage an event driven index and search infrastructure called "metaocean" across multiple source systems for triggering custom metadata extraction across a heterogeneous storage system environment. In one aspect, the metaocean may be the common repository, the centralized search index, or centralized key-value store.

In an additional aspect, events and the metadata tags may be indexed across the heterogeneous storage environment into the metaocean (e.g., the centralized search index). A search across the centralized key-value store may be performed for the events, metadata, or a combination thereof. In one aspect, the central repository may be a key-value store such as, for example, the centralized key-value store, but may also be a database such as, for example, a DB2 database provided by IBM® and/or a flat file or an extensible markup language (xml) file or any other way of storing information.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
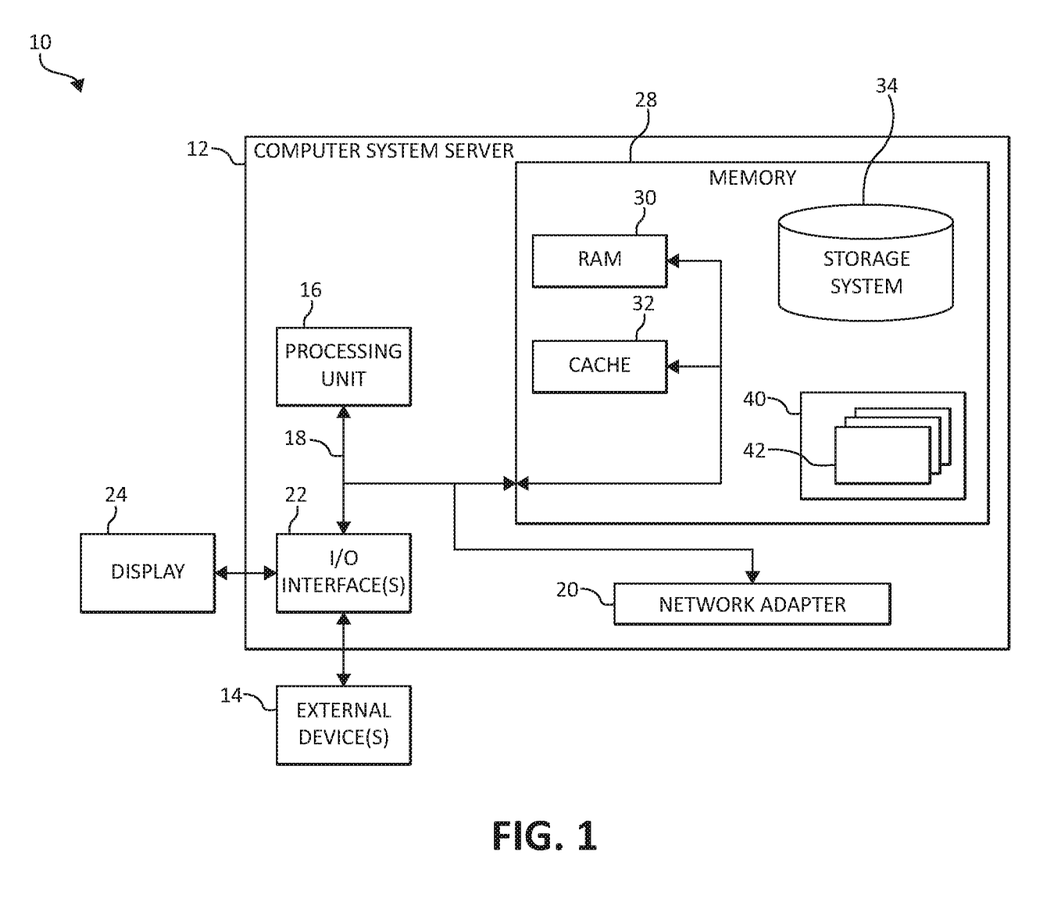
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
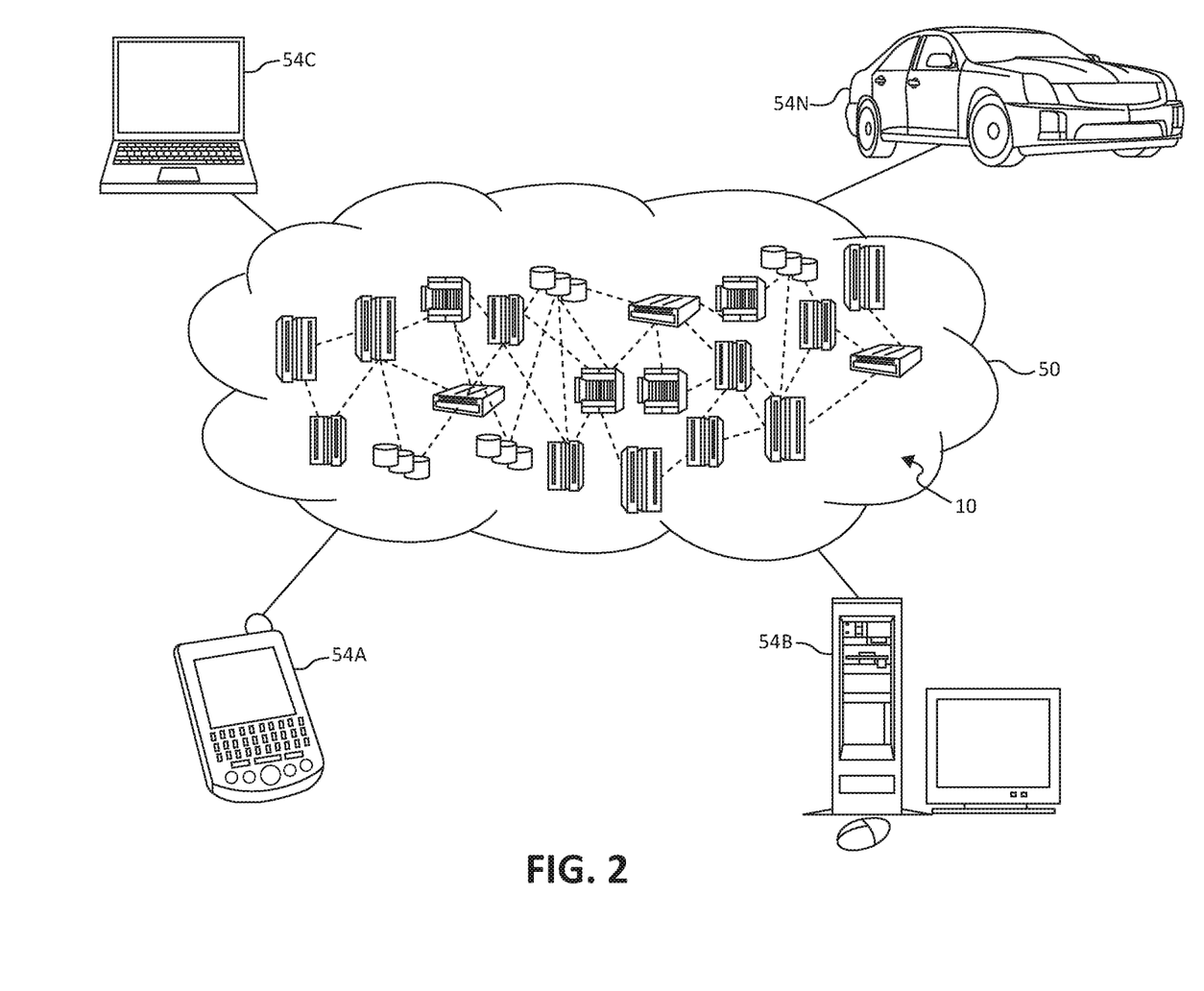
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
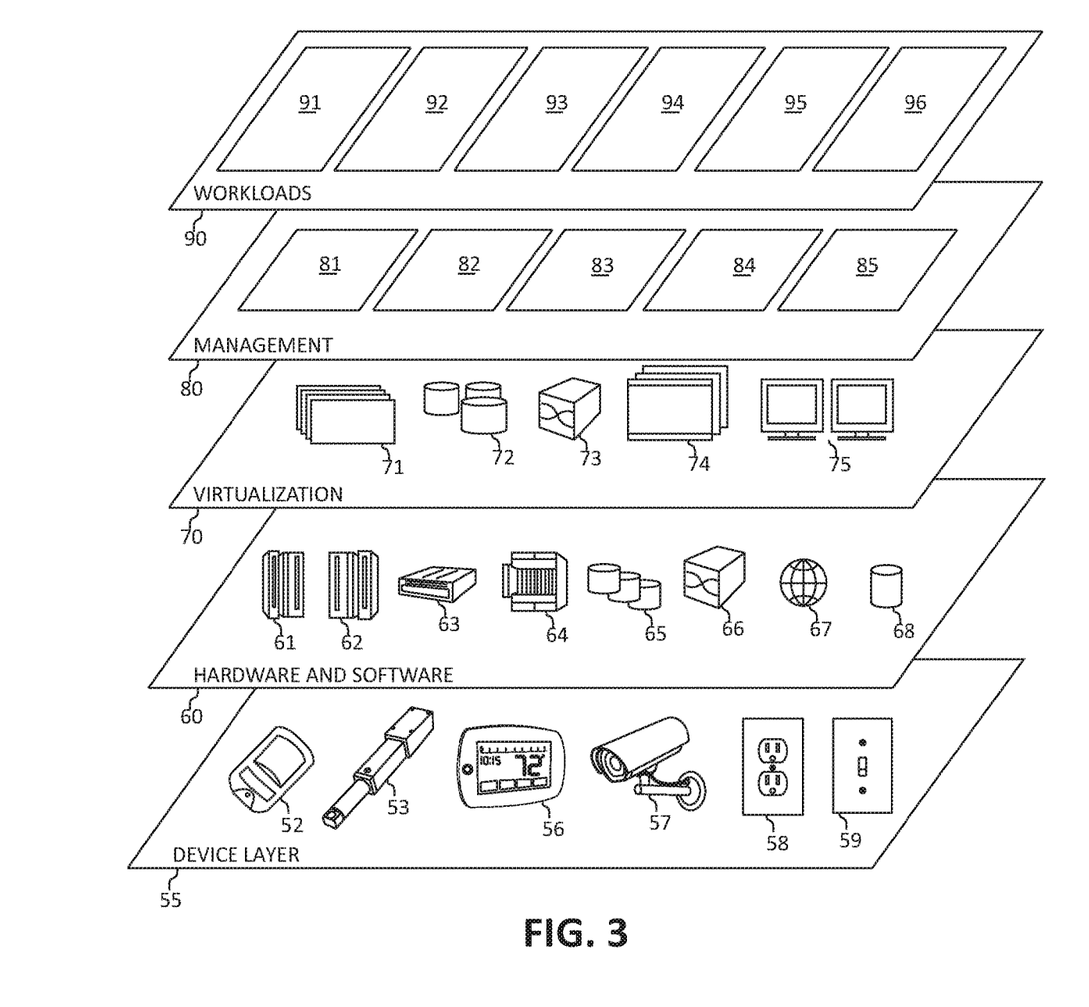
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various triggering custom metadata extraction workloads and functions 96. In addition, triggering custom metadata extraction workloads and functions 96 may include such operations as data analysis (including data collection and processing from various environmental sensors), metadata tagging, triggering custom metadata extraction, and/or analytics operations. One of ordinary skill in the art will appreciate that the triggering custom metadata extraction workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the triggering custom metadata extraction workloads. For example, the present invention may leverage a customized, application defined infrastructure tool that may be referred to herein as a metaocean, as illustrated in FIG. 4.

Figure 4:
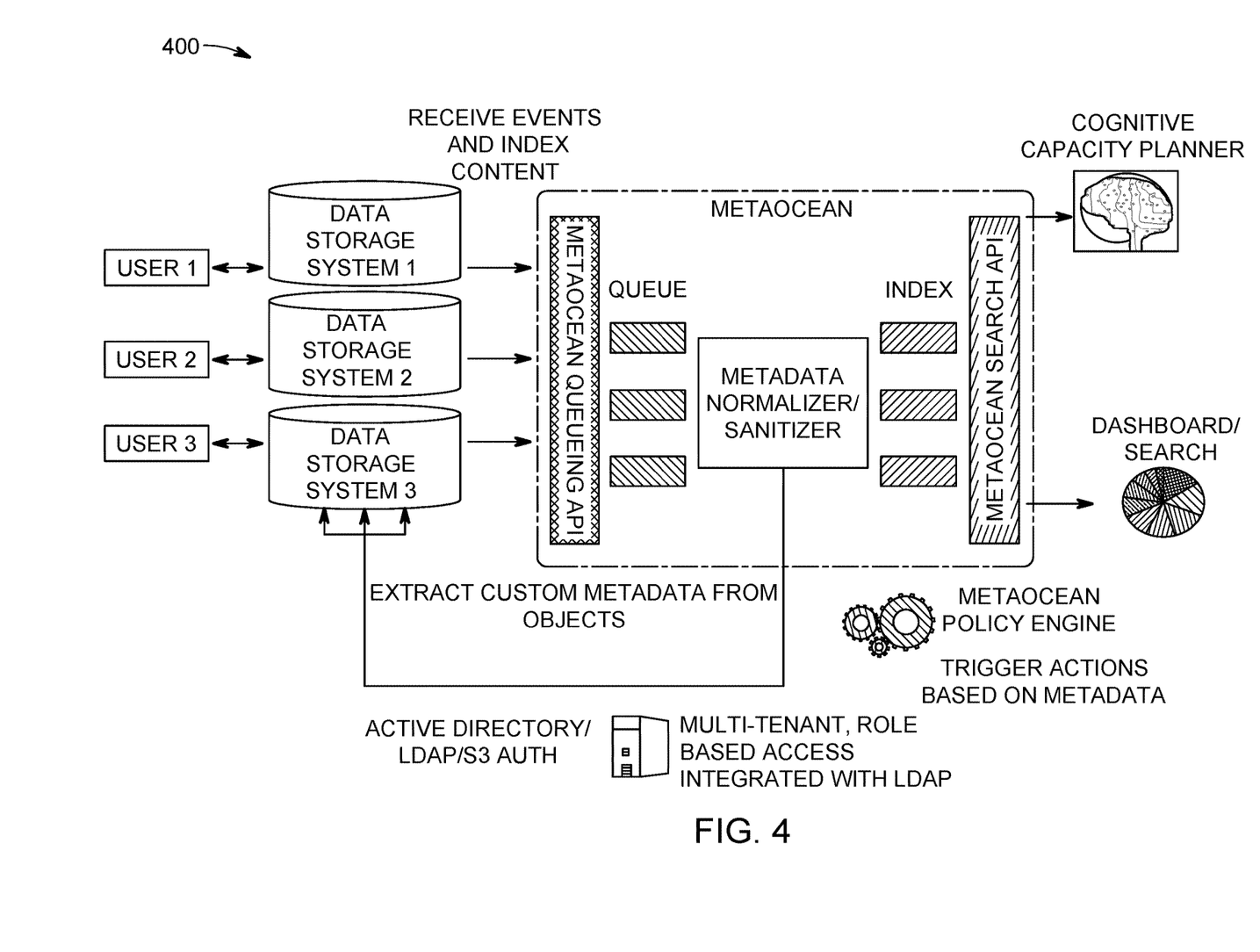
FIG. 4 is an additional block diagram depicting various user hardware and cloud computing components functioning using a centralized search index for indexing metadata in accordance with aspects of the present invention.

Turning now to FIG. 4, a block diagram 400 depicting various user hardware and cloud computing components functioning using a centralized event driven index and search infrastructure called "metaocean" having a migration data placement tool is depicted. The event driven index and search infrastructure may include a queuing application programming interface ("API" or "metaocean queuing API") for receiving one or more events from a plurality of heterogeneous storage systems such as, for example, one or more users (which may be web service providers) (e.g., user 1, user 2, and/or user 3 of FIG. 4). The event driven index and search infrastructure (e.g., a centralized search index) may also include a search API (e.g., a "metaocean search API"). For example, the plurality of heterogeneous storage systems (which may be web services providers) may be Spectrum Scale LightWeightEvents provided by IBM®, Spectrum Archive Event Notification provided by IBM®, S3 Simple notification service provided by Amazon®, Cloud Object Storage Event Notification provided by IBM®, fPolicy provided by NetApp®, and or other web service providers.

The events and content of the events may be placed in the queue of the event driven index and search infrastructure. The event driven index and search infrastructure may also include a metadata normalizer and/or sanitizer (e.g., data purging) and an index for indexing the events or contents of the events. For example, the event driven index and search infrastructure may capture metadata received from multiple heterogeneous sources such as, for example user 1, user 2, and/or user 3, and indexes the content. One or more users may query the set of information in order to perform data analytics and select a course of action (e.g., data migration strategy) based on the mined data. In one embodiment, users may include one or more interfaces, for controlling access to files stored on and/or in the users' devices or systems, to send events to the event driven index and search infrastructure about activity on the user.

The metadata normalizer and/or sanitizer may also remove the events from the queue and extract custom metadata from the data (e.g., files or objects). The custom metadata tags may be indexed in a centralized metadata store via live/real-time events from a plurality of heterogeneous storage systems. The custom metadata may be used in conjunction with source metadata (e.g., size pool metadata and storage pool metadata), operation type (e.g., read operation, write operation, get operation, put operation, delete operation, etc.), or a combination thereof. Analytics may be performed on the content (e.g., the custom metadata in conjunction with size and storage pool metadata) from the centralized metadata store to provide fine grain capacity utilization information across a heterogeneous storage domain. In an additional aspect, custom metadata key values may be added and used for resource utilization analytics to existing storage system metadata records via real-time indexing by events sent from the underlying storage system where the custom metadata tags may be added after the initial indexing of the live event containing the resource utilization metrics. That is, the events from a plurality of heterogeneous storage systems may also be indexed into the common repository.

The data may be automatically tagged in a storage system based on pre-defined rules in a policy engine (e.g., Metaocean policy engine). In response to receiving an event, the content of the live event may be inspected and custom metadata tags may be added to the data upon matching selected criteria according to the predefined rules. For example, a rules mechanism that maps users to departments and automatically sets department custom metadata tags in real time, which may include performing a lightweight directory access protocol ("LDAP") lookup, active directory ("AD") lookup, keystone server lookup, or other type of authentication lookup where, in order to avoid unnecessary authentication server lookups, the lookup only performs if the custom mapping is unknown (e.g., using multi-tenant, role based access integration with LDAP). Thus, the policy engine, having one or more rules and/or policies, may trigger performance based on the custom metadata tags.

Thus, the centralized search index (e.g., metaocean) enables users, departments, and/or projects to perform cognitive capacity planning based on real time events by tracking storage utilization for a plurality of heterogeneous storage systems from a unified control plane. That is, the cognitive capacity planner, working in conjunction with the centralized search index (e.g., metaocean), provides for viewing and planning capacity utilization across the plurality of heterogeneous storage systems environment by users, departments, and/or projects, etc. The metaocean may provide tracking and reporting using the custom metadata tag. The metaocean may also be searched and the search results (e.g., a fine grain capacity utilization tracking and reporting report) may be provided to a graphical user interface (GUI) of a computing device or dashboard of the device.

Figure 5:
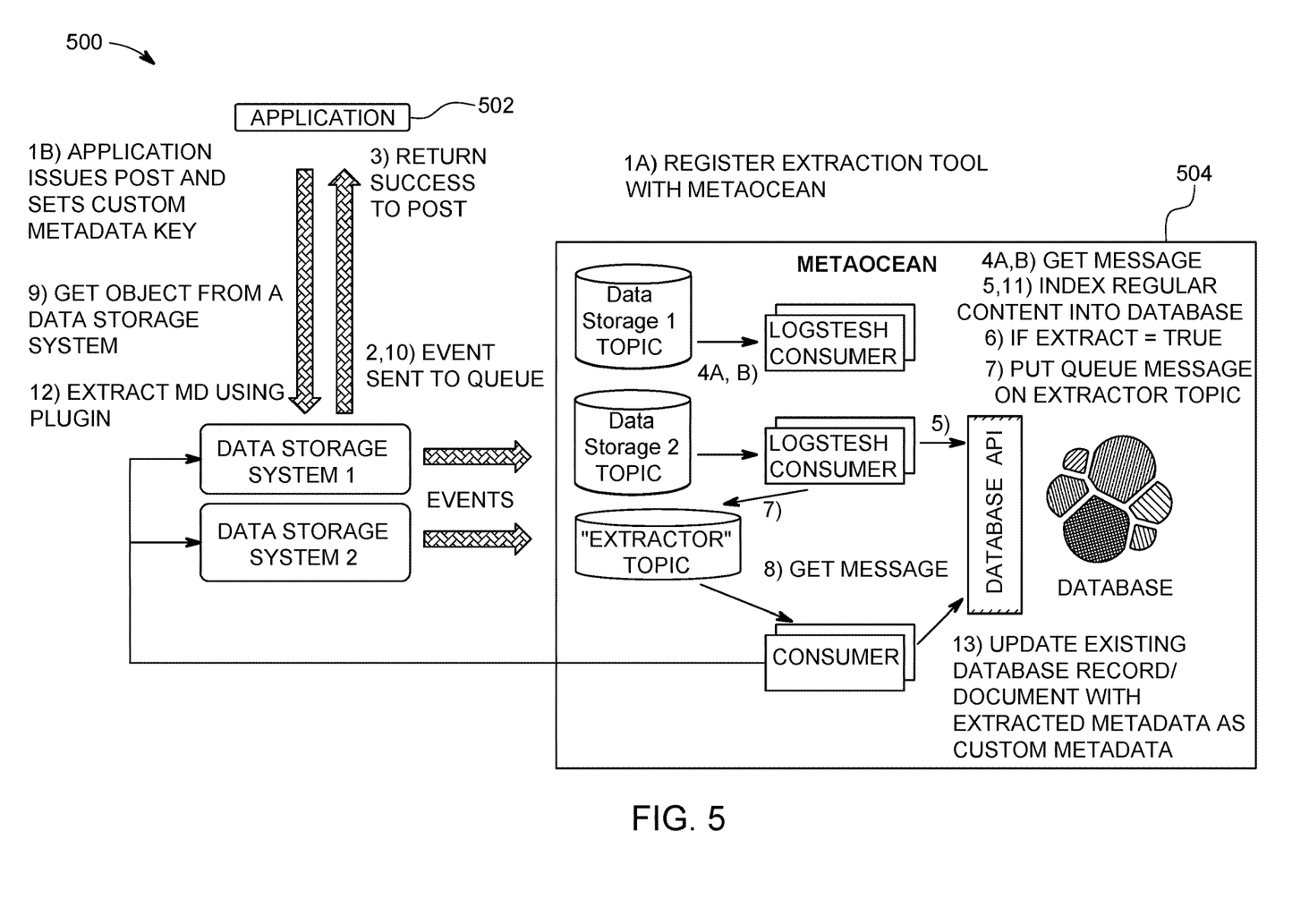
FIG. 5 is an additional block diagram depicting metadata enhancement on object stores in a heterogeneous storage system environment in which aspects of the present invention may be realized.

With the foregoing functional components 400 in view, triggering custom metadata extraction may be performed on a plurality of heterogeneous storage systems, as depicted in FIG. 5. More specifically, FIG. 5 depicts a flow diagram 500 for metadata enhancement on object stores using an event driven index and search infrastructure using metadata tags. As shown, the various functionality, or "modules" of functionality, hardware devices, and/or other components in the same descriptive sense as has been previously described in FIGS. 1-4 may be included in FIG. 5.

The functionality 500 may also include various blocks of functionality as depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. The module blocks 500 may also be incorporated into various hardware and software components of a system for triggering custom metadata extraction and may be performed on a plurality of heterogeneous storage systems in accordance with the present invention. Many of the functional blocks 500 may execute as background processes on various components, either in distributed computing components, or on the user device, or elsewhere, and generally unaware to the user and/or application performing generalized tasks.

When an application 502 (or user) inspects data to extract and index custom metadata, a Metaocean 504 (e.g. a centralized search index) may be used and included (or configured) with an extraction tool that may be used, as illustrated in step 1a. The Metaocean 504 may be included with default metadata extraction functions, which may be predefined or selected, for various types of data sources and/or data source types such as, for example, document types (e.g., digital imaging and communication in medicine "DICOM", Microsoft Office®, MP3, MOV, JPG, GeoTIFF, etc.). In one aspect, applications 502 (or users) may have the ability to upload custom metadata extraction tools. The application 502 (or user) may issue one or more commands such as, for example, a PUT or POST call to data storage system 1 and/or data storage system 2 (e.g., IBM Cleversafe® or IBM Spectrum Scale® object) and set a custom metadata key called extract to true, as in step 1b. It should be noted that one advantage of the present invention is that the configuring and execution of custom metadata extraction that leverages live events is completely transparent to the underlying object store. This causes an event to be triggered and/or generated by data storage system 1 and/or data storage system 2 (e.g., IBM Cleversafe® or IBM Spectrum Scale® object). As depicted in step 2, the event may be placed into a message queue (such as for example an open source message queue such as Apache® Kafka®).

After putting the event/message onto the message queue, a success notification may be returned to the POST/PUT operation, as shown in step 3. A normalizer, which may execute in a docker container, may scan the message, as shown in step 4a. (The consumer such as, for example, a Kafka® consumer, may pull a message off the message queue and perform some action such as, for example normalizing the content and place the normalized content into a database.) The event/message may be retrieved, as in step 4b. That is, in relation to steps 4b, 5, and 8, for example, the consumer may be a process or operation that pulls messages off the database storage topics or "extractor" topics and performs some action on the content such as, for example normalizing the message content and inserting it into a database.

The event/message may be indexed in the centralized search index (e.g., indexed in a database which allows for searching across all the data, all the columns, all the rows, and quick access to all data), as in step 5. The event/message may be searched to identify the extract custom metadata key being set to true, as depicted in step 6. If the extract custom metadata key is set to true, a new event is generated on an additional queue (e.g., IBM® Openwhisk®) or on a different queuing topic (e.g., "extractor" topic), as shown in step 7. The additional queue may provide a distributed compute service to execute application logic in response to events. The event/message may contain the source bucket and object to be inspected and also the name of the tool, used by metaocean 504, that will be invoked to perform deep inspection of the data to extract custom metadata. The metaocean, using the extract tool, may invoke the use of natural language processing (NLP), artificial intelligence (AI) APIs, other cognitive tools, or a combination thereof to extract metadata, such as, for example, IBM® Watson® APIs (IBM® Watson® Natural Language Understanding). The NLP and/or AI APIs (e.g., Watson Alchemy Vision) may invoke tools, methods, or other processes to extract defined headers for various data sources and/or data types.

A consumer may obtain the message (and perform some action upon the message), as in step 8. A source bucket and/or object may be used and a retrieve command ("GET") may be issued on the data storage system 1 and/or data storage system 2 (e.g., object store) to obtain the object (e.g., retrieving an object from the data storage system 1 and/or data storage system 2), as in step 9. This causes the data storage system 1 and/or data storage system 2 (e.g., object store) to send an event, as in step 10 (see also step 2), which may then be obtained by the consumer (4*b*) and indexed into the additional queue (e.g., indexed in the database), as in step 11. The extraction tool, used by the metaocean 504, may invoke the deep inspection method using a content detection and analysis operation, as in step 12. The existing database record or document may be updated for that object with the custom metadata that was extracted, as in step 13. (In one aspect, the consumer that pulls an original event may perform a deep data inspection/metadata extraction without having to use a post process queue.)

Thus, the triggered custom metadata may be indexed in the centralized search index 504 (which may be a centralized metadata store) via live/real-time events from a plurality of heterogeneous storage systems. The custom metadata may be used in conjunction with source metadata. The centralized search index (e.g., metaocean) 504 enables users or applications 502 to search the centralized search index 504 to visualize and manage the data in the plurality of heterogeneous storage systems. The metaocean 504 may also be searched and the search results may be provided to an interactive graphical user interface (GUI) of a computing device or dashboard of the device.

Figure 6:
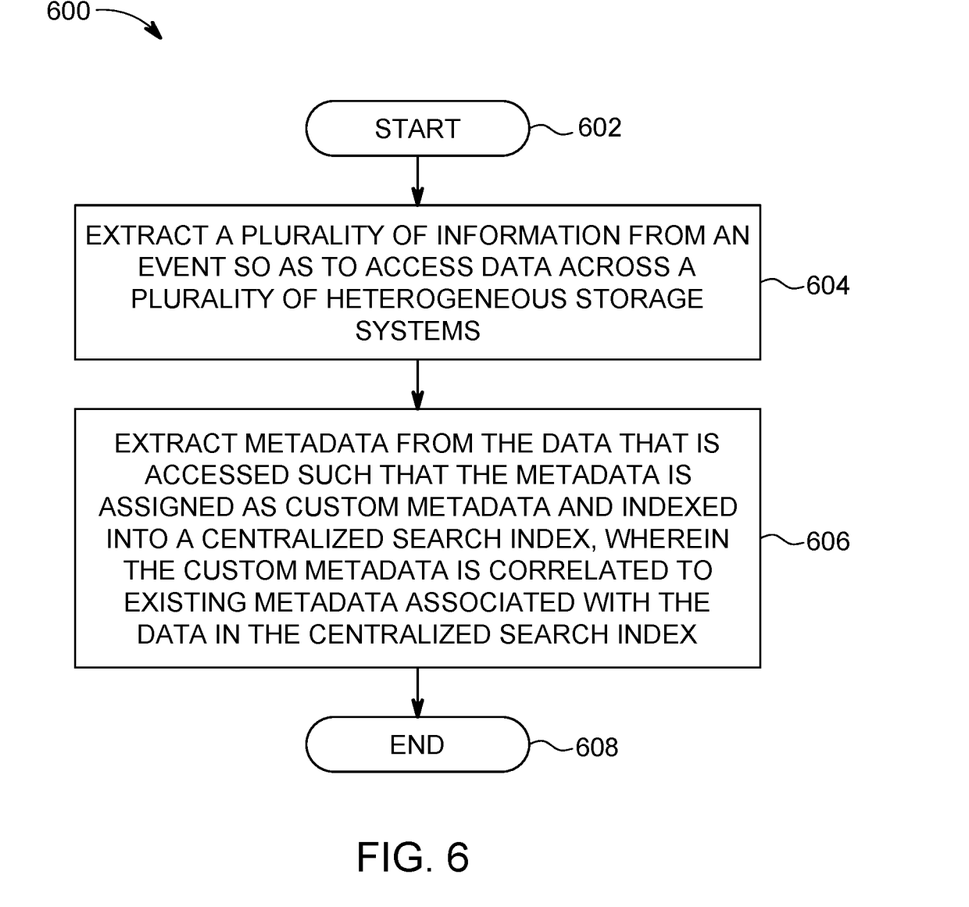
FIG. 6 is an additional flowchart diagram depicting an exemplary method for triggering custom metadata extraction across a heterogeneous storage system environment by a processor; again, in which aspects of the present invention may be realized.

Turning now to FIG. 6, a method 600 for triggering custom metadata extraction that may be performed on a plurality of heterogeneous storage systems is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602. Information may be extracted from an event so as to access data across a plurality of heterogeneous storage systems, as in block 604. Metadata may be extracted from the data that is accessed such that the metadata is assigned as custom metadata and indexed into a centralized search index, wherein the custom metadata is correlated to existing metadata associated with the data in the centralized search index, as in block 606. The functionality 600 may end in block 608.

In one aspect, in conjunction with and/or as part of at least one block of FIG. 6, the operation of 600 may include each of the following. The operation of functionality 600 may receive the events containing the metadata into the centralized search index. The operation of functionality 600 may also place the events onto an extraction queue in the centralized search index and/or poll the extraction queue to determine one or more actions to perform relating to extracting the metadata. The operation of functionality 600 may also perform a deep data inspection after extracting the plurality of information from the event. That is, a consumer that pulls the original event does the deep data inspection/metadata extraction without having to use a post process queue.

The custom metadata may be appended to the existing metadata. The data may be tagged according to selected criteria for extracting the metadata. In an additional aspect, the data may be tagged with the custom metadata according to selected criteria configured by a user, wherein a representational state transfer (REST) application protocol interface (API) is used to tag the custom metadata.

The operation of functionality 600 may assign values of the extracted metadata as the custom metadata. Also, the metadata to be extracted may be identified by performing a natural language processing (NLP) operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for triggering custom metadata extraction, comprising:
   extracting a plurality of information from an event so as to access data across a plurality of heterogeneous storage systems, wherein the plurality of information extracted from the event comprises source system access methods of the data including discerning applicable file names and file paths, and object names and object buckets or containers of the data;
   in response to extracting the plurality of information, accessing the data at the plurality of heterogeneous storage systems according to the extracted plurality of information;
   extracting metadata from the data that is accessed such that the metadata is assigned as custom metadata and indexed into a centralized search index, wherein the custom metadata is correlated to existing metadata associated with the data in the centralized search index; and
   tagging the data with the custom metadata according to selected criteria configured by a user, wherein the custom metadata includes directives to automatically resolve an applicable username and password of the user from an authentication lookup required to access the data.

2. The method of claim 1, further including receiving the events containing the metadata into the centralized search index.

3. The method of claim 1, further including performing a deep data inspection after extracting the plurality of information from the event.

4. The method of claim 1, further including:
   placing the events onto an extraction queue in the centralized search index; and
   polling the extraction queue to determine one or more actions to perform relating to extracting the metadata.

5. The method of claim 1, further including appending the custom metadata to the existing metadata.

6. The method of claim 1, further including tagging the data according to the selected criteria for extracting the metadata.

7. The method of claim 1, wherein a representational state transfer (REST) application protocol interface (API) is used to tag the custom metadata.

8. The method of claim 1, further including assigning values of the extracted metadata as the custom metadata.

9. The method of claim 1, further including identifying the metadata to be extracted by performing a natural language processing (NLP) operation.

10. A system for triggering custom metadata extraction, comprising:
    one or more computers with executable instructions that when executed cause the system to:
      extract a plurality of information from an event so as to access data across a plurality of heterogeneous storage systems, wherein the plurality of information extracted from the event comprises source system access methods of the data including discerning applicable file names and file paths, and object names and object buckets or containers of the data;
      in response to extracting the plurality of information, access the data at the plurality of heterogeneous storage systems according to the extracted plurality of information;
      extract metadata from the data that is accessed such that the metadata is assigned as custom metadata and indexed into a centralized search index, wherein the custom metadata is correlated to existing metadata associated with the data in the centralized search index; and
      tag the data with the custom metadata according to selected criteria configured by a user, wherein the custom metadata includes directives to automatically resolve an applicable username and password of the user from an authentication lookup required to access the data.

11. The system of claim 10, wherein the executable instructions receive the events containing the metadata into the centralized search index.

12. The system of claim 10, wherein the executable instructions perform a deep data inspection after extracting the plurality of information from the event.

13. The system of claim 10, wherein the executable instructions:
place the events onto an extraction queue in the centralized search index; and
poll the extraction queue to determine one or more actions to perform relating to extracting the metadata.

14. The system of claim 10, wherein the executable instructions append the custom metadata to the existing metadata.

15. The system of claim 10, wherein the executable instructions tag the data according to the selected criteria for extracting the metadata.

16. The system of claim 10, wherein a representational state transfer (REST) application protocol interface (API) is used to tag the custom metadata.

17. The system of claim 10, wherein the executable instructions assign values of the extracted metadata as the custom metadata.

18. The system of claim 10, wherein the executable instructions identify the metadata to be extracted by performing a natural language processing (NLP) operation.

19. A computer program product for triggering custom metadata extraction by a processor, the computer program product comprising a non-transitory computer-readable storage medium having computer-readable program code portions stored therein, the computer-readable program code portions comprising:
an executable portion that extracts a plurality of information from an event so as to access data across a plurality of heterogeneous storage systems, wherein the plurality of information extracted from the event comprises source system access methods of the data including discerning applicable file names and file paths, and object names and object buckets or containers of the data;
an executable portion that, in response to extracting the plurality of information, accesses the data at the plurality of heterogeneous storage systems according to the extracted plurality of information;
an executable portion that extracts metadata from the data that is accessed such that the metadata is assigned as custom metadata and indexed into a centralized search index, wherein the custom metadata is correlated to existing metadata associated with the data in the centralized search index; and
an executable portion that tags the data with the custom metadata according to selected criteria configured by a user, wherein the custom metadata includes directives to automatically resolve an applicable username and password of the user from an authentication lookup required to access the data.

20. The computer program product of claim 19, further including an executable portion that performs a deep data inspection after extracting the plurality of information from the event.

21. The computer program product of claim 19, further including an executable portion that:
receives the events containing the metadata into the centralized search index;
places the events onto an extraction queue in the centralized search index; and
polls the extraction queue to determine one or more actions to perform relating to extracting the metadata.

22. The computer program product of claim 19, further including an executable portion that appends the custom metadata to the existing metadata.

23. The computer program product of claim 19, further including an executable portion that tags the data according to the selected criteria for extracting the metadata.

24. The computer program product of claim 19, wherein a representational state transfer (REST) application protocol interface (API) is used to tag the custom metadata.

25. The computer program product of claim 19, further including an executable portion that assigns values of the extracted metadata as the custom metadata.

26. The computer program product of claim 19, further including an executable portion that identifies the metadata to be extracted by performing a natural language processing (NLP) operation.

* * * * *